United States Patent [19]

Templeman

[11] 3,841,058

[45] Oct. 15, 1974

[54] METHOD FOR THE PURIFICATION OF NATURAL GAS

[75] Inventor: John Joseph Templeman, Solihull, England

[73] Assignee: British Gas Corporation, London, England

[22] Filed: Mar. 2, 1973

[21] Appl. No.: 337,533

[30] Foreign Application Priority Data
Mar. 3, 1972  Great Britain.................... 10180/72

[52] U.S. Cl.............................. 55/33, 55/58, 55/62, 55/68, 55/75
[51] Int. Cl.....:...................................... B01d 53/04
[58] Field of Search............... 55/33, 58, 62, 68, 74, 55/75, 179, 389

[56] References Cited
UNITED STATES PATENTS

| | | | |
|---|---|---|---|
| 3,221,477 | 12/1965 | Aynoldi et al.......................... | 55/33 |
| 3,242,651 | 3/1966 | Arnoldi.................................. | 55/33 |
| 3,531,916 | 10/1970 | Kulperger et al....................... | 55/33 |

OTHER PUBLICATIONS
Advances In Petroleum Chemistry and Refining, Vol. IV Nov. 1961, pgs. 115 and 119 to 121.

*Primary Examiner*—Charles N. Hart
*Attorney, Agent, or Firm*—Watson, Cole, Grindle & Watson

[57] ABSTRACT

A method of purifying natural gas or the like to render it suitable for liquefaction which method consists essentially of absorbing water and methanol from a stream of natural gas containing water, methanol and carbon dioxide in a first bed of an absorbent material, and subsequently absorbing the carbon dioxide in a second bed of absorbent material, regenerating the absorbent material of the said first bed by passing gas therethrough at an elevated temperature, regenerating the absorbent material of the said second bed at a temperature not exceeding 100°C, and thereafter again purifying natural gas to remove therefrom water, methanol and carbon dioxide employing the regenerated materials. The material of the first bed is generally selected from the group consisting of a molecular sieve material and a desiccant material. The material of the second bed is generally a molecular sieve material.

6 Claims, 2 Drawing Figures

METHOD FOR THE PURIFICATION OF NATURAL GAS

BACKGROUND OF THE INVENTION

This invention relates to the purification of natural gas.

Natural gas, as distributed from the stations at which it is received from the wells, contains small concentrations of carbon dioxide and of water and methanol vapours, the latter substance having been added to prevent hydrocarbon hydrate formation.

Liquefaction of the natural gas is practised as a convenient means of storage. As a preliminary, the concentrations of the carbon dioxide, water and methanol must be reduced sufficiently to avoid the formation of solid deposits on cooling; such formations would accumulate on heat exchanger surfaces in the liquefaction plant and blockages would ensue.

PRIOR ART

Current purification practice is shown in FIG. 1. The impurities are absorbed by a bed of molecular sieve; a choice of suitable proprietary sieve materials exists.

More specifically, natural gas is distributed in the transmission main at ambient temperature, about 15°C, and at a pressure of up to 1,000 p.s.i. Prior to liquefaction of the gas, the pressure is reduced for instance to 550 p.s.i. An example of the approximate impurity level is:

| | |
|---|---|
| $CO_2$ | 1000 v.p.m. |
| $H_2O$ | 80 v.p.m. |
| MeOH | 50 v.p.m. |

There are indications that in this country carbon dioxide concentrations will increase, perhaps as much as five-fold.

The natural gas is passed via pipe 10 to a bed of a molecular sieve A in which water, methanol and carbon dioxide are removed. The thus purified natural gas then proceeds via pipe 11 to a liquefaction plant.

Saturation of the absorptive capacity of the bed of molecular sieve is observed by monitoring the outlet gas and detecting the appearance of carbon dioxide in it. A fresh bed is brought on stream and the saturated bed is regenerated, as necessary.

Regeneration is brought about by passing a hot stream of already purified natural gas through the bed; a temperature of some 300°C is required to ensure the desorption and removal of the water and methanol, whereas the carbon dioxide is much more easily removed and comes off as the bed is heating up. It is customary to heat the whole bed to 300°C as described, and to continue the passage of hot gas for some 20 minutes after the outlet end has reached that temperature before allowing the bed to cool in a stream of cold purified natural gas. This procedure may be achieved by using, for example, one quarter of the natural gas emerging from molecular sieve bed A and passing this via pipe 12 through heat exchanger C to raise the temperature of the natural gas to the desired 300°C. The heated natural gas is then passed via pipe 13 through molecular sieve bed B and effects the regeneration of the molecular sieve material. Thereafter the natural gas emerging from the molecular sieve bed B passed via pipe 14 to a heat exchanger D where it is cooled to 15°C, and then is passed at a pressure of 525 p.s.i. via pipe 15 to a local transmission main. This procedure has some important disadvantages.

The repeated exposure of the molecular sieve material to alternate heating to 300°C and cooling is accompanied by a fall in its absorptive capacity per cycle; experimental observations have shown that the capacity (for carbon dioxide) can be halved after 30 cycles.

A high proportion, say 25 percent, of the gas purified in one vessel is used to regenerate the sieve in another. The only outlet for the gas thus used for regeneration is in a local transmission and distribution system and the need for a system of sufficient capacity to be available can influence the location of the liquefaction and storage plant.

The present invention depends on the observation that water and methanol are so much more strongly absorbed by molecular sieves than is carbon dioxide that, notwithstanding the much higher concentration of the latter, the water and methanol are preferentially absorbed at the inlet end of the column. A further consequence of this observed difference in strength of absorption is that carbon dioxide can be removed from the saturated bed at ambient temperatures by pressure reduction; it is only for the removal of the water and methanol that heating is necessary.

SUMMARY OF THE INVENTION

According to the present invention, there is provided a method of purifying natural gas or the like to render it suitable for liquefaction, which method comprises absorbing water and methanol from a stream of natural gas or the like containing water, methanol and carbon dioxide in a first bed of an absorbent material, and subsequently absorbing the carbon dioxide in a second bed of absorbent material, such as molecular sieve material, regenerating the absorbent material of the said first bed by passing gas therethrough at an elevated temperature, preferably from 250° to 350°C, regenerating the absorbent material of the said second bed at a temperature not exceeding 100°C, and then again purifying natural gas to remove therefrom water, methanol and carbon dioxide employing the regenerated materials. The invention also includes gas which has been purified by the method of this invention, as well as liquefied gas produced therefrom.

DESCRIPTION OF PREFERRED EMBODIMENTS

The absorbent material used in the first stage to remove the water and methanol may be molecular sieve; it may alternatively be an ordinary desiccant that can be regenerated by the process specified.

Although any suitable gas may be passed through the first bed to regenerate it, it is strongly preferred to use natural gas because of its ready availability and because its use eliminates the need to purge vessels when they are changed from operation on purification duty to regeneration and vice-versa.

The regeneration of the second bed is preferably carried out by applying suction to the bed, so that the carbon dioxide is desorbed at reduced pressure and such regeneration may conveniently be assisted by the passage through the said bed of a stream of gas, preferably natural gas. This gas is preferably the vehicle for imparting heat to the bed during regeneration when that mode of operation is chosen. The temperature of regeneration is preferably much below 100°C; it may for instance be ambient or even sub-ambient.

Figure 2:
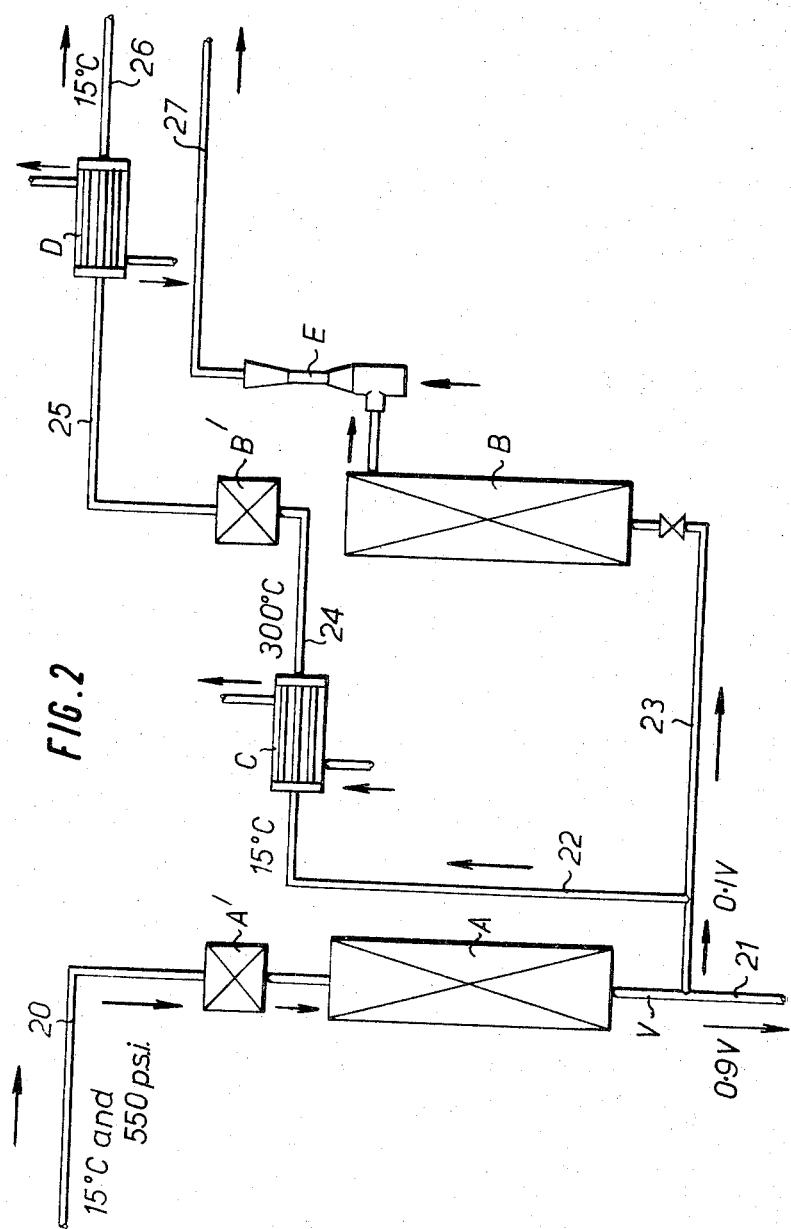

FIG. 2 of the accompanying drawing illustrates the method of this invention and the improved apparatus. Natural gas at a pressure of 550 p.s.i. and at ambient temperature, about 15°C, is passed via pipe 20 through two vessels A¹ and A of which each contain a molecular sieve material. The approximate impurity level of the natural gas is:

| | |
|---|---|
| $CO_2$ | 1000 v.p.m. |
| $H_2O$ | 80 v.p.m. |
| MeOH | 50 v.p.m. |

The first vessel A¹ contains a smaller bed of molecular sieve material, and is intended for the absorption of the methanol and water vapour, and the second vessel A contains a larger bed for the carbon dioxide. For a gas containing the concentrations of impurities mentioned above, (that is, carbon dioxide, 1,000; water, 80; methanol, 50 v.p.m.) the smaller bed may contain about ten percent of the whole charge of molecular sieve. The proportion of the whole volume of molecular sieve represented by the smaller bed depends on the concentration of impurities expected to be encountered, and will fall as the carbon dioxide concentration rises. If a concentration of 5,000 v.p.m. were to be encountered, the other figures being unchanged, the proportion represented by the smaller bed would be as low as about 2 percent. However, the proportion is unlikely to exceed 20 percent in practical situations. The purified natural gas then passes via pipe 21 to a liquefaction plant.

When the vessels require to be regenerated, a proportion, about 10 percent (0.1v), of the purified natural gas is used to provide separate streams 22 and 23 of purified gas. The stream 22 is heated by passage through a heat exchanger C to a temperature of about 300°C. This stream is then passed via pipe 24 through the small bed B¹ of spent molecular sieve material and effects regeneration from water and methanol (and any carbon dioxide that it may have absorbed) as before. The stream 22 is a very small proportion, say 3 percent, of the purified stream issuing from companion pair of vessels A and A¹. The natural gas emerging from vessel B¹ is passed via pipe 25 to heat exchanger D where it is cooled to a temperature close to ambient temperature, it is then passed via pipe 26 to a local mains supply.

The larger vessel B is regenerated by pressure reduction by any convenient means, but the availability of a supply of gas at high pressure on site makes it convenient to use a jet pump ejector E driven by a supply of unpurified natural gas for this purpose. A small stream of preferably purified natural gas is admitted to vessel B via pipe 23 to sweep away the desorbed carbon dioxide; it may be desired to raise its temperature to a moderate extent (not above 100°C, preferably not above 50°C) in order to increase the rate of desorption of carbon dioxide. The gas is then passed via pipe 27 to a local mains supply.

It will be appreciated that each set of vessels will alternate its function. Thus, when one set of vessels becomes fouled it will then undergo regeneration, preferably using for the regeneration gas which has been purified by another set of vessels.

Figure 1:
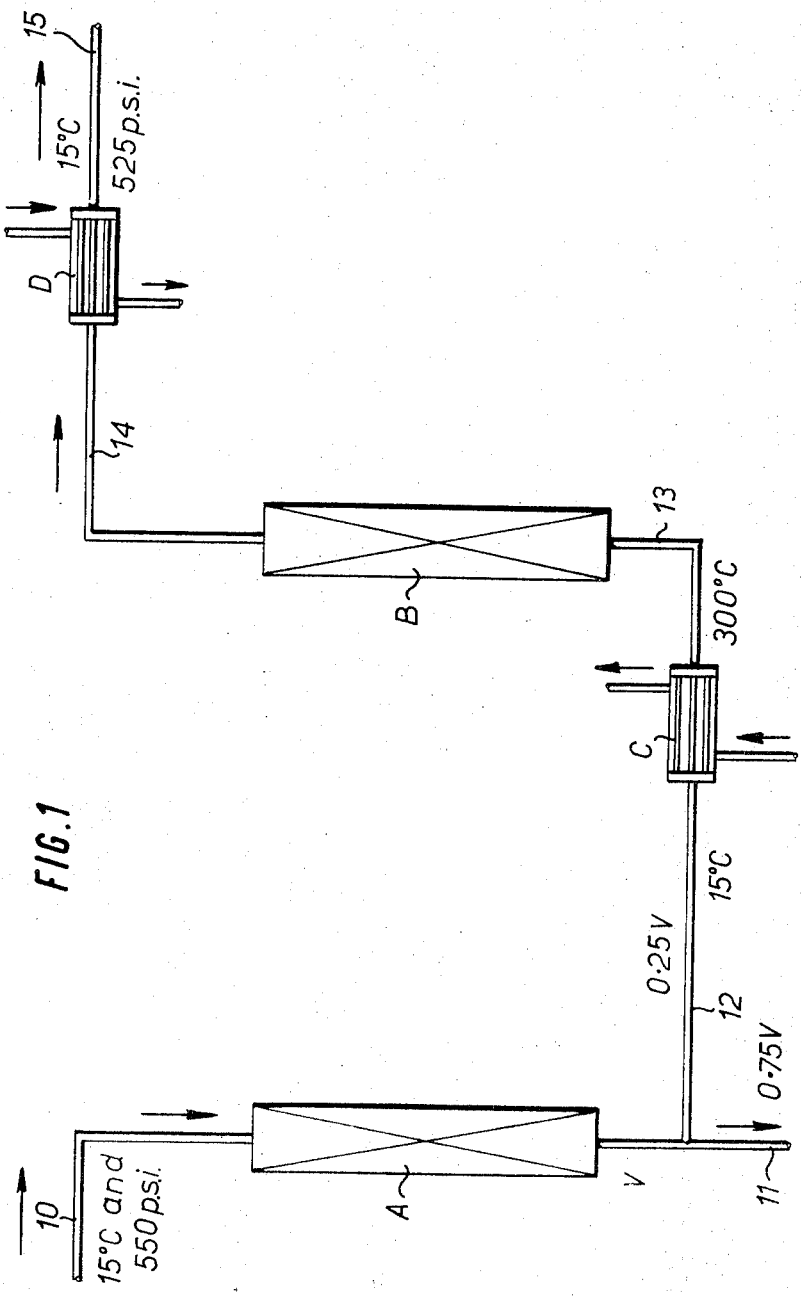

The proportion of purified natural gas used, in total, for regeneration is substantially reduced by the improved method of the invention; it may represent, for instance, ten per cent instead of twenty five, as indicated in FIG. 1. The gas used for regeneration is disposed of, together with the unpurified gas used to drive the ejector, in a local distribution system, as before. The total consumption of gas, purified, and unpurified, for regeneration, is less than in the known art, so that a smaller distribution system is needed to receive it.

It is furthermore not strictly necessary for the small stream of gas used to assist the regeneration of the carbon dioxide absorber to be completely purified, provided that it is free from water vapour and methanol. Further economy in purified gas is achieved by using unpurified gas for this purpose, as is possible because of the lower pressure.

It is within the scope of the invention to use different molecular sieves for the larger and smaller beds, choice depending on the preferential absorption properties of the materials. Such choice may also influence the relative sizes of the beds. It is also within the scope of the invention to use alternatively a simple desiccant, for instance, silica gel, instead of a molecular sieve, to absorb the water and methanol vapours.

Over and above the advantage of reduced consumption of purified natural gas for regeneration, other benefits which accrue include 1. avoidance of heating the sieve used for carbon dioxide absorption during its regeneration, or at least avoidance of raising its temperature to a level which affects its absorptive capacity, so that the absorption time in a cycle is not reduced and the operating life of a charge is prolonged;
11. reduction of the amount of heat required for regeneration, since only the small stream of gas passing to the smaller vessel needs to be heated to 300°C.

In circumstances where the regeneration of the larger bed takes a shorter time than that of the smaller bed, as may arise especially if the larger bed is gently warmed, it is within the scope of the invention to associate a plurality of, preferably two, vessels containing smaller beds with each larger bed, so that a regenerated larger bed can be brought back onto purification duty with a minimum of delay. The necessary pipework and valving for this method of operation will be within the skill and knowledge of the worker in this field.

An extension of the improved process is to apply cooling to the gas between the first and second purification stages, so that the removal of carbon dioxide takes place at sub-ambient temperatures, within the range 0° to −50°C, say at about −25°C. This takes advantage of the increased absorptive capacity of molecular sieves at lower temperatures. Regeneration is then preferably conducted at or near this temperature.

The invention also includes apparatus for purifying natural gas in accordance with the method described above, such apparatus being substantially as hereinbefore described with reference to FIG. 2 of the accompanying drawings.

It is to be understood that the invention is not to be limited to removing water, methanol and carbon dioxide from natural gas; the procedures described above can be used to remove methanol or water, or both, and carbon dioxide from any other gas stream which is substantially non-absorbed by the absorbents employed.

I claim:

1. In a method of purifying natural gas to render the same suitable for liquefaction wherein water, methanol and carbon dioxide are absorbed therefrom using an absorbent material and thereafter the absorbent material is regenerated by the passage of gas therethrough, the improvement which consists essentially of absorbing water and methanol from a stream of natural gas containing such contaminants in a first bed of an absorbent material and subsequently absorbing carbon dioxide from said natural gas stream in a second bed of an absorbent material, the gas issuing from the first bed being cooled to a temperature of from 0° to 50°C before passage through the second bed, the absorbent material of the first bed being regenerated by passing dry gas therethrough at a temperature in the range of 250°C to 350°C and the material of the second bed being regenerated by passage therethrough of natural gas substantially free from water and methanol at a temperature not exceeding 100°C and by applying suction to the bed, and thereafter again purifying natural gas to remove water, methanol and carbon dioxide therefrom employing the regenerated absorbent materials.

2. The method as claimed in claim 1 wherein the first bed of absorbent material is molecular sieve material.

3. The method as claimed in claim 1 wherein the first bed of absorbent material is desiccant material.

4. The method as claimed in claim 1 wherein the gas is natural gas.

5. The method as claimed in claim 1 wherein the second bed of absorbent material is molecular sieve material.

6. The method as claimed in claim 1 wherein a stream of gas is passed through the bed during the regeneration.

* * * * *